United States Patent
Le Houerou et al.

(10) Patent No.: US 10,498,668 B2
(45) Date of Patent: Dec. 3, 2019

(54) COMMUNICATION DEVICES IN A COMMUNICATION NETWORK AND METHODS FOR PROCESSING DATA IN SUCH DEVICES

(71) Applicant: CANON KABUSHIKI KAISHA, Tokyo (JP)

(72) Inventors: Brice Le Houerou, Acigne (FR); François Thoumy, Vignoc (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 14/135,333

(22) Filed: Dec. 19, 2013

(65) Prior Publication Data

US 2014/0177649 A1    Jun. 26, 2014

(30) Foreign Application Priority Data

Dec. 21, 2012 (GB) .................................. 1223280.7

(51) Int. Cl.
  *H04L 12/911* (2013.01)
  *G06F 13/38* (2006.01)

(52) U.S. Cl.
  CPC .......... *H04L 47/826* (2013.01); *G06F 13/382* (2013.01)

(58) Field of Classification Search
  None
  See application file for complete search history.

(56) References Cited

U.S. PATENT DOCUMENTS

| | | | |
|---|---|---|---|
| 5,940,407 A * | 8/1999 | Tamura | H04L 12/6418 370/474 |
| 7,065,036 B1 * | 6/2006 | Ryan | 370/208 |
| 2003/0138060 A1 * | 7/2003 | Alcouffe | 375/324 |
| 2004/0042460 A1 * | 3/2004 | Gruhl | H04L 47/10 370/395.4 |
| 2004/0100898 A1 * | 5/2004 | Anim-Appiah | H04L 1/206 370/210 |
| 2006/0029168 A1 * | 2/2006 | Chuang | H04L 27/2647 375/347 |
| 2008/0089311 A1 * | 4/2008 | Roy | H04B 7/2612 370/345 |
| 2008/0170586 A1 * | 7/2008 | Huff et al. | 370/463 |

(Continued)

*Primary Examiner* — Chirag G Shah
*Assistant Examiner* — Suk Jin Kang
(74) *Attorney, Agent, or Firm* — Canon U.S.A., Inc. IP Division

(57) ABSTRACT

A communication device in a communication network according to the invention comprises: a signal processing unit configured to demodulate symbols of a received digital signal into payload data to be provided to a data processing unit through an interfacing link, e.g. a MAC/PHY interface, the received digital signal being made of raw data; a bandwidth determining module configured to determine available bandwidth in a transmission slot allocated to one symbol of the received digital signal for transmitting corresponding payload data through the interfacing link; a sampler configured to select raw data from the received digital signal that correspond to the determined available bandwidth; and a multiplexer configured to combine the selected raw data with the payload data corresponding to the one symbol into the same transmission packet to be provided to the data processing unit through the interfacing link.

20 Claims, 5 Drawing Sheets

(56) References Cited

U.S. PATENT DOCUMENTS

| | | | |
|---|---|---|---|
| 2008/0181249 A1* | 7/2008 | Karaoguz | H04L 69/18 370/419 |
| 2008/0300992 A1* | 12/2008 | Wang | G06F 13/385 705/16 |
| 2009/0034460 A1* | 2/2009 | Moratt | H04W 72/04 370/329 |
| 2009/0232133 A1* | 9/2009 | Yu et al. | 370/389 |
| 2010/0020770 A1* | 1/2010 | Qin | H04N 21/2381 370/336 |
| 2010/0091920 A1* | 4/2010 | Alexander | H04L 1/0045 375/350 |
| 2011/0007844 A1* | 1/2011 | Park, II | H04B 1/7097 375/302 |
| 2012/0182955 A1* | 7/2012 | Karaoguz | H04L 69/18 370/329 |
| 2012/0198315 A1* | 8/2012 | Soliman | H04L 1/0009 714/786 |
| 2013/0051277 A1* | 2/2013 | Hakola et al. | 370/254 |
| 2013/0286876 A1* | 10/2013 | Moratt | H04W 72/04 370/252 |

* cited by examiner

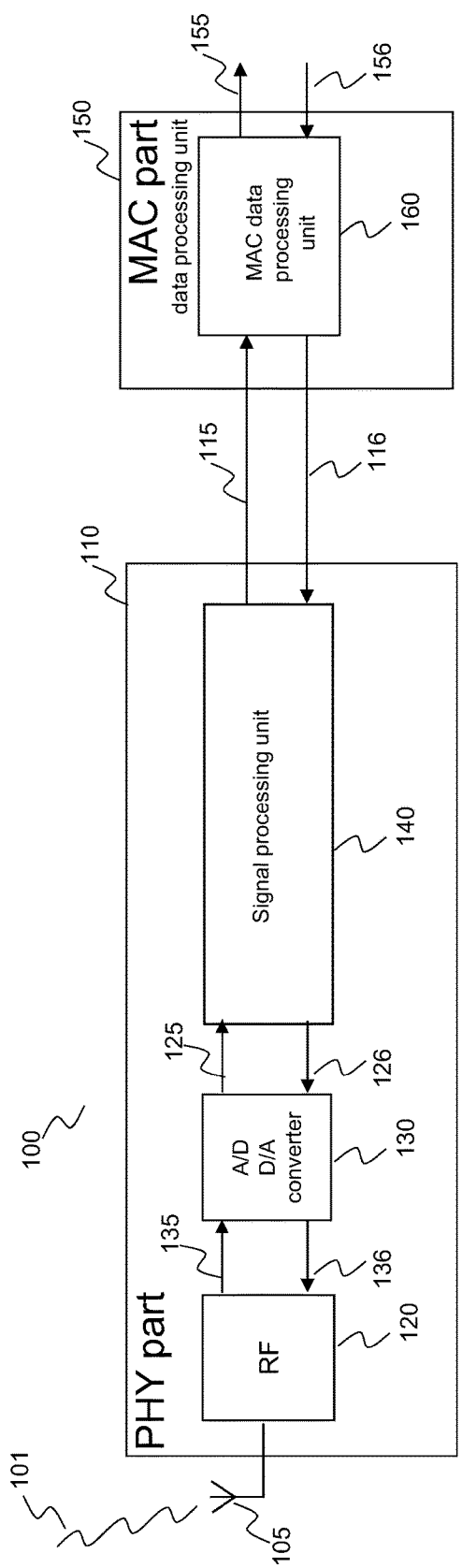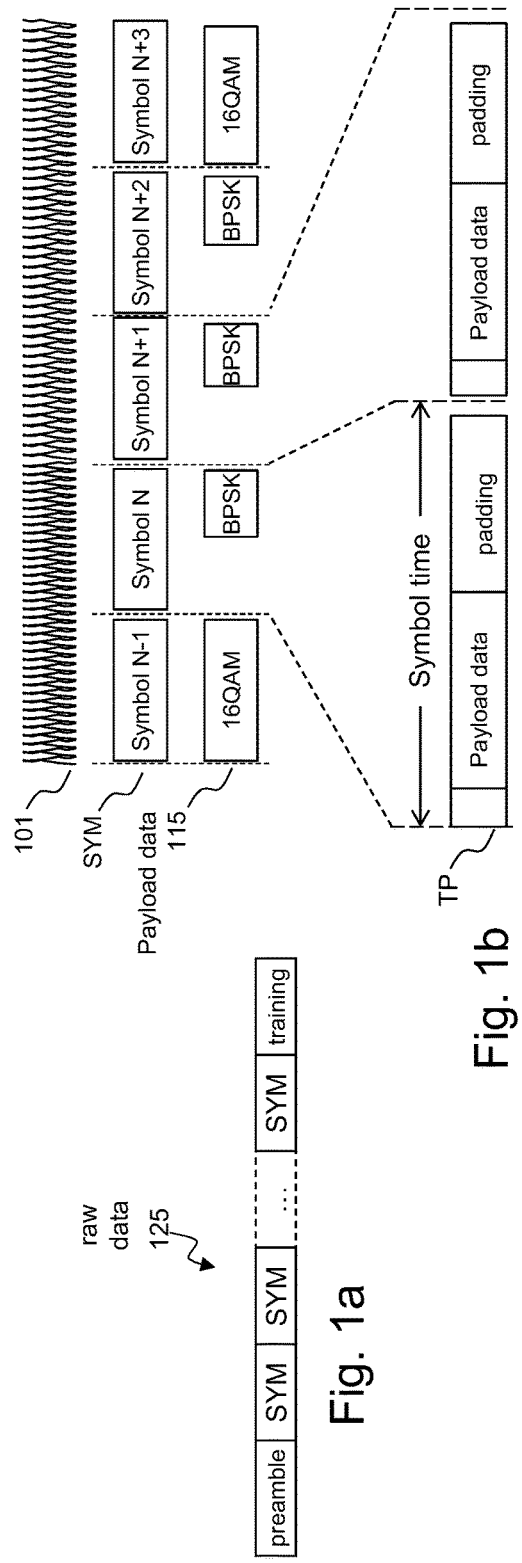

COMMUNICATION DEVICES IN A COMMUNICATION NETWORK AND METHODS FOR PROCESSING DATA IN SUCH DEVICES

This application claims the benefit under 35 U.S.C. § 119(a)-(d) of United Kingdom Patent Application No. 1223280.7, filed on Dec. 21, 2012 and entitled "Communication devices in a communication network and methods for processing data in such devices". The above cited patent application is incorporated herein by reference in its entirety

FIELD OF THE INVENTION

The present invention relates in general to data transmission internal to a communication device of a communication network, and in particular, to transmission of data through an interfacing link between internal components.

BACKGROUND OF THE INVENTION

Recent multimedia applications, such as wireless home audio and video applications, require sending or transmission of signals made of uncompressed video data over a communication network for display at a displaying device.

Today video data are often high-definition audio/video content, thus requiring communication at high data rate of several Gigabits per second (Gbps) with low latency and high quality of service for comfortable display.

For instance, an uncompressed high definition (HD) video (i.e., 60 Hz frames of 1920 vertical lines and 1080 horizontal lines corresponding to 1920×1080 pixels of 24 bits) has a bitrate of about 3 Gbps.

WPAN (standing for "Wireless Personal Area Network") home networks based on millimetre wave unlicensed spectrum, referred to as 60 GHz millimetre wave technology, are suitable for home audio and video applications having such bitrate. Several standards of WPANs are currently in process, for example IEEE 802.11 Task Group, IEEE 802.15.3c standard, Wireless HD, WiGiG.

To offer a high level of reliability to the applications, the application data, i.e. the payload data generated by the application, are modulated into modulated symbols that have a higher bitrate than the payload data themselves, before they are converted into analogue signals and transmitted over the wireless medium (generally air) of the communication network.

The digital signal before conversion is made of raw data, the main part of which is made of the modulated symbols. Other raw data may be formed by headers, error-detecting codes, etc. The raw data thus represent the data as transmitted over the communication network.

Such higher bitrate may reach 50 Gbps and is due to the reliability mechanisms implemented in lowest layers of the OSI model (standing for "Open Systems Interconnection"), for example to the headers, to additional error-detecting codes, etc.

In this context, the lowest OSI layers of the communication devices must be designed to support very high rates.

The lowest OSI layer, so-called Physical (PHY) layer, is the layer which handles the data with the highest rate, and interfaces the communication device with the physical medium used for data transmission. Practically, the PHY layer implements modulator to modulate payload data received from the upper layer into modulated symbols and implements digital-to-analogue (D/A) converter to convert such modulated symbols into an analogue signal. Reciprocally, an analogue-to-digital, A/D, converter is implemented followed by a demodulator when operating in a receiving mode.

The next upper layer, so-called Data Link layer just above the PHY layer, provides the functional and procedural means to transfer data between communication devices of the network and to detect and possibly correct errors that may happen at the PHY Layer. A well-known sub-layer of the Data Link layer is the MAC layer (standing for "Media Access Control").

Due to the complexity of the modulation/demodulation implemented at the PHY layer to provide high quality/high data rates wireless communications, the data rate used at the interface between the PHY layer and the communication module adapted to the wireless medium as well as the data rate used internally to the PHY layer are considerably higher than the data rate of the payload data provided by/to the Data Link layer.

For example, a ratio of ten is often observed between the highest data rate in the PHY layer and the payload data rate in the Data Link layer.

For cost reasons, the data path or interfacing link between the PHY layer and the Data Link layer is usually designed to support data rates of about the payload data rate, but not the highest data rates of the PHY layer. The maximum bandwidth of the interfacing link is designed to support at least the maximum payload data rate corresponding to the highest code rate implemented by the PHY layer and supported by the Data Link (or MAC) layer.

This interfacing link is generally a hardware link, such as for example a wire link with or without connectors, a chip-to-chip interface or an internal link inside an integrated circuit, because the PHY layer and the Data Link layer are often designed in separate hardware parts.

In particular, with high data rates, partitioning the communication device in two or more hardware parts may reveal to be advantageous.

For example, some applications would benefit a lot from integrating the PHY interface in a place very well adapted to communication but where space is too reduced to accommodate the entire device processing hardware.

In specific applications like radio communications where the power of received signal varies a lot with the position of the antenna (this is the case with 60 GHz radio communication systems), it is advantageous to freely integrate the PHY layer part everywhere in the device, independently of the application signal processing hardware.

The invention thus focuses on designs where a first hardware part implements essential means of the PHY layer, while a separate second hardware part implements at least essential means of the Data Link layer, including for example the MAC sub-layer and means for connecting to the application.

The two separate hardware parts can be two separate devices, two separate modules internal to the same device, two integrated circuits or two sub-parts on the same integrated circuit.

The link interfacing the two separate hardware parts is known as the MAC/PHY interface.

The invention also focuses on situations where non-demodulated data internal to the PHY layer are used by the Data Link or MAC layer. Non-demodulated data internal to the PHY layer encompass raw data directly retrieved from received digital signals and other data generated from such raw data, wherein the generation does not include demodulation.

This is to perform specific signal processing at the Data Link layer. For example, the PHY-layer non-demodulated data may help the Data Link layer to improve the communication quality.

In a case of point-to-point wireless communication, knowledge of received signals could be used to apply pre-coding in the communication device operating as a transmitter. For that case, raw data internal to the PHY layer could be transmitted to the Data Link layer, which in turn manages their transmission back to the transmitter in order for the transmitter to calculate and apply pre-coding of data.

This approach has been studied and corresponding results have been disclosed in publication "Writing on dirty paper with feedback" by Jialing Liut and Nicola Elia (Communications in information and systems, Vol. 5, N° 4, 2005).

Another case relates to channel measurements, like the Error vector Measurement (EVM), performed by the PHY layer that could be forwarded to the Data Link layer. This helps the latter to anticipate degradation of the communication quality and to set a new communication scheme if required (like a new relay scheme, new antenna settings).

Yet another case relates to signal measurement for chip calibration. In an example where the PHY layer is integrated on a chip and has analogue parts, A/D converters and digital signal processing unit, calibration of digital signal processing unit in the chip could be performed with regard to the behavior of the analogue parts integrated on the chip in factory.

These cases show that there are plenty of situations where non-demodulated data internal to the PHY layer are useful to an upper layer, in particular the Data Link layer.

As explained above, the interfacing link or MAC/PHY interface between the two layers is not designed to support transmission of all the non-demodulated data (about 50 Gbps). Solutions to overcome that situation are thus sought.

Publication U.S. Pat. No. 7,565,140 discloses a device for processing received wireless signals, wherein a network interface can be switched between two modes of operation. A first mode outputs signals having base-band values resulting from conversion of base band values of the received wireless signals using parameters such as a user-defined gain, a user-defined sampling frequency and a user-defined sampling rate. A second mode outputs signals having values representing data frames of the received wireless signals, based on conversion parameters according to a communication protocol.

The two modes of operation are exclusive one from the other, meaning that they cannot operate simultaneously.

SUMMARY OF THE INVENTION

However when using two exclusive modes of operation, difficulties arise when applications cannot support signal interruption. This is because switching to a mode where non-demodulated data but not payload data are transmitted over the MAC/PHY interface will immediately stop the reception of payload data at the application.

This is the case for continuous communication mode applications such as video applications, since the video should be continuously displayed without image freeze or image jump or loss of quality.

Using a video frame buffer has been proposed to support a short interruption of the video data flow without impact on the display when non-demodulated data are communicated to the Data Link layer. However, the size of that buffer shall be kept as small as possible to decrease the product cost, and thus can only support very short interruption for high rate videos.

To avoid implementation of such buffer, video data are preferably transmitted in streaming mode. In that case, it is not possible to stop the video payload data at all in order to transmit PHY-layer internal non-demodulated data to the Data Link layer.

No technique able to transmit non-demodulated data internal to the PHY layer to the Data Link layer over the MAC/PHY interface while simultaneously keeping the transmission of payload data over the same MAC/PHY interface is known.

The present invention seeks to overcome at least one of the foregoing drawbacks.

In this context, according to a first aspect of the invention, there is provided a communication device in a communication network, comprising:

a signal processing unit configured to demodulate symbols of a received digital signal into payload data to be provided to a data processing unit through an interfacing link, the received digital signal being made of raw data;

a bandwidth determining module configured to determine available bandwidth in a transmission slot allocated to one symbol of the received digital signal for transmitting corresponding payload data through the interfacing link;

a sampler configured to select non-demodulated data that correspond to the determined available bandwidth, from amongst raw data of the received digital signal and data generated from raw data of the received digital signal using no demodulation;

a multiplexer configured to combine the selected non-demodulated data with the payload data corresponding to the one symbol into the same transmission packet to be provided to the data processing unit in the transmission slot over the interfacing link.

This defines a communication device when operating in a receiving mode.

According to a second aspect of the invention, there is provided a communication device in a communication network, comprising:

a data processing unit configured to obtain payload data to be provided to a signal processing unit through an interfacing link;

a signal processing unit configured to modulate the received payload data into modulated symbols of a digital signal to be transmitted over the communication network;

wherein the data processing unit comprises:

a raw data generator configured to generate raw data;

a bandwidth determining module configured to determine available bandwidth in a transmission slot used to transmit, through the interfacing link, payload data corresponding to one modulated symbol;

a sampler configured to select generated raw data corresponding to the determined available bandwidth;

a multiplexer configured to combine the selected raw data with the payload data corresponding to the one modulated symbol into the same transmission packet to be provided to the signal processing unit in the transmission slot over the interfacing link;

wherein the signal processing unit is configured to include the raw data as received from the data processing unit in the digital signal together with the one modulated symbol.

This defines a communication device when operating in a transmitting mode.

The same communication device can operate in both receiving and transmitting modes.

From both the receiver's and the transmitter's perspectives, the invention makes it possible to simultaneously transmit non-demodulated data, e.g. raw data directly extracted from received signal, and payload data after demodulation of raw data (symbols), to an upper layer (here the Data Link layer). Non-demodulated data of lower layer having a data rate higher than the limited bandwidth of the interfacing link can thus be transmitted on said interfacing link to the upper layer.

Consequently the upper layer can perform specific signal processing based on the non-demodulated data while an application (e.g. video streaming) using the payload data continuously works.

This is achieved by multiplexing the non-demodulated data (experiencing no modulation/demodulation compared to corresponding raw data in the signal transmitted over the network) and the payload data over the interfacing link.

No interruption of the application happens since the non-demodulated data are transmitted in sub-parts that are not used in the time transmission slots (within transmission packets) for application data transmission.

More particularly, non-demodulated data to be multiplexed is selected from among an amount of non-demodulated data according to the bandwidth available in a transmission packet used to transmit payload data corresponding to a given symbol (or sub-part of the symbol, or several symbols). That means that the non-demodulated data forming a high-rate specific consistent set of non-demodulated data may be spread over several transmission packets having a lower rate.

In addition, thanks to the multiplexing, the invention can be implemented in existing MAC/PHY interfaces, as soon as their bandwidth is not entirely used when transmitting the payload data of demodulated symbols.

The MAC/PHY interface can thus be used to transmit data having a data rate higher than the one originally specified for that interface, whatever the technology used for that interface (parallel lines, serial links or optical links).

Extra signal processing to improve communication quality for example can also be provided at the Data Link layer without additional cost.

Correspondingly, according to a third aspect of the invention, there is provided a method for processing data in a communication device of a communication network, comprising:

in a signal processing unit, demodulating symbols of a received digital signal into payload data to be provided to a data processing unit through an interfacing link, the received digital signal being made of raw data; determining available bandwidth in a transmission slot allocated to one symbol of the received digital signal for transmitting corresponding payload data through the interfacing link;

selecting non-demodulated data that correspond to the determined available bandwidth, from amongst raw data of the received digital signal and data generated from raw data of the received digital signal using no demodulation;

in a multiplexer, combining the selected non-demodulated data with the payload data corresponding to the one symbol into the same transmission packet to be provided to the data processing unit in the transmission slot over the interfacing link.

This is the corresponding method from the receiver's perspective.

According to a fourth aspect of the invention, there is provided a method for processing data in a communication device of a communication network, comprising:

in a data processing unit, obtaining payload data to be provided to a signal processing unit through an interfacing link;

in a signal processing unit, modulating the received payload data into modulated symbols of a digital signal to be transmitted over the communication network;

wherein the method further comprises, in the data processing unit:

generating raw data;

determining available bandwidth in a transmission slot used to transmit, through the interfacing link, payload data corresponding to one symbol to modulate;

selecting generated raw data corresponding to the determined available bandwidth;

combining the selected raw data with the payload data corresponding to the one symbol into the same transmission packet to be provided to the signal processing unit in the transmission slot over the interfacing link;

wherein the method further comprises, in the signal processing unit, including the raw data as received from the data processing unit in the digital signal together with the one symbol.

This is the corresponding method from the transmitter's perspective.

The methods of the invention combine the advantages as set out above with respect to the communication devices, namely the sharing of non-demodulated data internal to a lower high-rate layer to an upper lower-rate layer while keeping continuous flow of payload data to an upper end application.

Other features for the communication devices in embodiments of the invention are further defined in the dependent appended claims. The methods of the invention can implement steps corresponding to these other features.

From the receiver's perspective, one embodiment of the invention provides that a bandwidth of the interfacing link is less than the rate of the received digital signal. The invention as defined above is particularly efficient in this context, by overcoming the interface rate shortage when transmitting the high rate data to the upper (MAC) layer.

In another embodiment of the invention, the transmission slot allocated to the one symbol over the interfacing link has the same length of time as the length of time of the one symbol in the received digital signal, i.e. the length of time given the high rate at the PHY layer. This is possible since the demodulation of the symbol before transmission over the lower-rate interfacing link decreases the data rate from the high rate of the PHY layer to a lower rate of the Data Link layer. The above provision ensures synchronization between the signal reception and payload transmission.

In variants, the transmission slot may be sized to a unit fraction of the symbol time length in the received digital signal (thus several transmission slots over the MAC/PHY interface are used to convey the payload data for the same symbol) or may be sized to a multiple of the symbol time length (the same transmission slot being thus used to convey the payload data for a corresponding multiplicity of symbols).

In yet another embodiment of the invention, the bandwidth determining module is configured to determine the length of time allocated to the payload data in the transmission slot, based on a bandwidth of the interfacing link and a code rate of the payload data; and configured to determine a second length of time corresponding to the remaining time in the transmission slot. The interfacing link bandwidth corresponds to a maximum code rate for payload data given the transmission slot length. The above provision makes it possible to directly derive the non-used bandwidth available to transmit non-demodulated data (e.g. raw data from received digital signals). The amount of non-demodulated data that can be transmitted depends on the second length of time and on the rate of the raw data in the received signal.

In yet another embodiment of the invention considering data rates rather than lengths of time, the sampler is configured to select non-demodulated data at a data rate complementary to a data rate simultaneously experienced by the signal processing unit to generate the payload data, given a data rate of the interfacing link. Using the maximum data rate of the interfacing link, this provision optimizes use of the interface bandwidth and thus can transmit as much as possible non-demodulated data.

In yet another embodiment of the invention, the multiplexer comprises a packetizer configured to generate a transmission packet for the transmission slot allocated to the one symbol, the transmission packet being made of two successive portions, a first portion including the selected non-demodulated data and a second portion including the payload data corresponding to the one symbol. Using two portions makes it easier for the data processing unit to retrieve the payload data separately from the transmitted non-demodulated data. The first portion may be prior to the second portion in the transmission packet, if preference is given to an earlier access to the non-demodulated data to conduct a specific signal processing. In a variant, the second portion may be prior to the first portion in the transmission packet, if preference is given to an earlier access to the payload data.

In yet another embodiment of the invention, the data processing unit includes a de-packetizer configured to retrieve the payload data and the non-demodulated data from a received transmission packet, and configured to forward the payload data to a MAC data processing unit for further transmission to an application and the non-demodulated data to a software processing unit. This ensures the data processing unit to properly process the transmitted payload and non-demodulated data.

In yet another embodiment of the invention, the raw data are selected from non-demodulated data of the received signal that represent a symbol to be demodulated in the received signal. The same symbol is thus used to provide both payload data to an application and non-demodulated data to the data processing unit for specific signal processing. Indeed, some symbols can be used as reference data for such specific signal processing, e.g. to estimate the communication channel state.

According to a particular feature, the raw data representing the same demodulated symbol are split over several transmission slots on the interfacing link, preferably over successive transmission slots. This is to compensate the difference of data rate between the raw data (high rate of about 50 Gbps) and the remaining bandwidth in the interfacing link (at most a few Gbps).

In yet another embodiment of the invention, the communication device further comprises a raw data selector configured to select raw data representing symbols of the received digital signal that are to be provided to the data processing unit. Providing a specific raw data selector makes it possible to differentiate conventional demodulation to generate payload data from the specific generation of raw data (as part of the non-demodulated data) to be transmitted to the upper layer.

According to a particular feature, the raw data selector includes a frame detector configured to determine which symbols in the received digital signal correspond to a start of a data frame. Raw data identified based on data frame start can thus be easily determined and selected.

In particular, the raw data selector may be configured to receive a symbol selection signal from the data processing unit, wherein the symbol selection signal includes an index of a first symbol to select and a number of symbols to select; and to select symbols in the received digital signal based on the received symbol selection signal and on a data frame start signal generated by the frame detector. Symbols to be transmitted as such (i.e. as raw data) to the data processing unit are thus efficiently detected and selected from the received digital signal.

According to another particular feature, the raw data selector includes a symbol storage module configured to store the raw data representing symbols selected from the received digital signal before they are sampled by the sampler and multiplexed with payload data in transmission slots. A buffer is thus implemented from which the raw data to be transmitted as such are progressively selected. Such a buffer makes the management of the raw data easier.

In yet another embodiment of the invention, the data processing unit includes a software processing unit configured to receive the non-demodulated data from the transmission packet and configured to determine statistics about communication quality over the communication network based on the received non-demodulated data in order to adjust reception or communication parameters of the communication device. This reflects one useful scenario of transmitting PHY-layer non-demodulated data to an upper layer.

In yet another embodiment of the invention, the data processing unit includes a software processing unit configured to receive the non-demodulated data from the transmission packet and configured to determine a state of a communication channel in the communication network based on the received non-demodulated data. This reflects another scenario of use of transmitted PHY-layer non-demodulated data.

In yet another embodiment of the invention relating to yet another scenario, the data processing unit includes a software processing unit configured to receive the non-demodulated data from the transmission packet and configured to determine, based on the received non-demodulated data, signal distortion due to a processing entity internal to the communication device, in order to adjust at least one operational parameter of the internal processing entity.

From the transmitter's perspective, one embodiment of the invention provides that a bandwidth of the interfacing link is less than the rate of the digital signal to be transmitted over the communication network. Again, the invention as defined above is particularly efficient in this context, by overcoming the interface rate shortage when transmitting high rate raw data from the upper (MAC) layer to the lower (PHY) layer.

In another embodiment of the invention, the transmission slot allocated to transmit payload data corresponding to the one modulated symbol has the same length of time as the length of time of the one modulated symbol in the digital signal to be transmitted over the communication network, i.e. the length of time given the high rate at the PHY layer. Again, this ensures synchronization between payload transmission to PHY layer and the signal transmission over the external communication network.

In variants, the slot time length may be a unit fraction or a multiple of the symbol time length in the digital signal.

In yet another embodiment of the invention, the bandwidth determining module is configured to estimate a code rate at which the payload data are modulated by the signal processing unit and to estimate a length of time allocated to the payload data in the transmission slot, based on a bandwidth of the interfacing link and the estimated code rate of the payload data; and configured to determine a second length of time corresponding to the remaining time in the transmission slot. Again, this provision makes it possible to directly derive the non-used bandwidth available to transmit raw data.

In yet another embodiment of the invention considering data rates rather than lengths of time, the sampler is configured to select raw data at a data rate complementary to an estimated data rate experienced by the signal processing unit to generate the modulated symbols, given a data rate of the interfacing link. Using the maximum data rate of the interfacing link, this provision optimizes use of the interface bandwidth and thus can transmit as much as possible raw data.

In yet another embodiment of the invention, the multiplexer comprises a packetizer configured to generate a transmission packet for the transmission slot allocated to the payload data corresponding to the one modulated symbol, the transmission packet being made of two successive portions, a first portion including the selected raw data and a second portion including the payload data corresponding to the one modulated symbol. Similarly to the receiver, using two separate portions in the transmission packet makes it easier for the signal processing unit to retrieve the payload data separately from the transmitted raw data.

In yet another embodiment of the invention, the communication device further includes a de-packetizer configured to retrieve the payload data and the raw data from a received transmission packet, and configured to forward the payload data to the signal processing unit for further modulation and the raw data to a selector buffer. This ensures the lower (PHY) layer to properly process the transmitted payload and raw data.

According to a particular feature, the communication device further comprises a selector configured to select data to include in the digital signal to be transmitted over the communication network, between the modulated symbols provided by the signal processing unit and the raw data in the selector buffer. The selector buffer is thus implemented from which the raw data to be transmitted as such over the communication network are progressively selected. Such a buffer makes the management at the PHY layer easier.

In particular, raw data stored in the selector buffer is selected for inclusion as stored in the digital signal to be transmitted over the communication network when the signal processing unit does not provide a modulated symbol to the selector. This provision particularly applies to streaming transmission, since every time slot in the streamed digital signal that is not used to transmit modulated payload data can thus be used to transmit the additional raw data as generated and provided by the data processing unit to the PHY layer.

In yet another embodiment of the invention, raw data forming the same consistent set of raw data, e.g. a symbol, are split over several transmission slots on the interfacing link, preferably over successive transmission slots. This is to compensate the difference of data rate between the raw data (high rate of about 50 Gbps) and the remaining bandwidth in the interfacing link (at most a few Gbps).

In yet another embodiment of the invention, the data processing unit comprises a symbol storage module configured to store generated raw data before they are sampled by the sampler and multiplexed with payload data in transmission slots. A buffer is thus implemented from which the raw data to be transmitted as such are progressively selected. Such a buffer makes the management of the raw data easier.

According to a particular feature, the generated raw data are reference data dedicated for a receiving device receiving the transmitted digital signal including these reference data to determine statistics about communication quality over the communication network in order to adjust reception or communication parameters of that receiving device or to determine a state of a communication channel in the communication network. This reflects scenarii of use of PHY-layer raw data generated by an upper layer.

According to another particular feature, the data processing unit includes a software processing unit configured to determine, based on the generated raw data, signal distortion due to a processing entity internal to the communication device, in order to adjust at least one operational parameter of the internal processing entity. This may be done by using the signal output by said internal processing unit when processing the raw data.

According to a fifth aspect of the invention, there is provided a communication device in a communication network, comprising:

a network interface with the communication network, the network interface being configured to demodulate and decode received raw digital signals into decoded digital signals (similar to the payload data as defined above);

a data processing unit configured to receive the decoded digital signals from the network interface through an interfacing link having a bandwidth less than the rate of the received raw digital signals, and configured to process the received decoded digital signals;

wherein the network interface is further configured to generate transmission packets for the data processing unit that contain both non-demodulated digital signals and decoded digital signals, the non-demodulated digital signals comprising received raw digital signals or digital signals generated from received raw digital signals using no demodulation; and the data processing unit is further configured to process the transmitted non-demodulated digital signals and to send control signal to the network interface for the latter to select non-demodulated digital signals to transmit to the data processing unit from amongst the received raw digital signals and digital signals generated from the received raw digital signals using no demodulation.

According to a sixth aspect of the invention, there is provided a communication device in a communication network, comprising:

a data processing unit configured to process applicative digital signals received from an application (e.g. of an applicative layer according to the OSI model);

a network interface configured to encode and modulate applicative digital signals received from the data processing unit over an interfacing link into modulated digital signals, the interfacing link having a bandwidth less than the rate of transmission by the network interface over the communication network, and to transmit digital signals including the modulated digital signals on the communication network;

wherein the data processing unit is further configured to generate transmission packets for the network interface that contain both raw digital signals and applicative digital signals; and the network interface is further configured to combine raw digital signals received from the data processing unit and generated modulated digital signals into the digital signals to transmit on the communication network.

The communication devices of the fifth and sixth aspects of the invention have similar advantages as set out above with respect to the communication devices of the first and second aspects of the invention.

They may implement optional features similar to those defined above from the receiver's and transmitter's perspectives.

According to a seventh aspect of the invention, there is provided a method for processing data in a communication device of a communication network, comprising:

in a network interface with the communication network, demodulating and decoding raw digital signals received by the network interface over the communication network into decoded digital signals;

in a data processing unit, receiving the decoded digital signals from the network interface through an interfacing link having a bandwidth less than the rate of the received raw digital signals, and processing the received decoded digital signals;

wherein the method further comprises in the network interface, generating transmission packets for the data processing unit that contain both non-demodulated digital signals and decoded digital signals, the non-demodulated digital signals comprising received raw digital signals or digital signals generated from received raw digital signals using no demodulation; and in the data processing unit, processing the transmitted non-demodulated digital signals and sending control signal to the network interface for the latter to select non-demodulated digital signals to transmit to the data processing unit from amongst the received raw digital signals and digital signals generated from the received raw digital signals using no demodulation.

According to a eighth aspect of the invention, there is provided a method for processing data in a communication device of a communication network, comprising:

in a data processing unit, processing applicative digital signals received from an application;

in a network interface, encoding and modulating applicative digital signals received from the data processing unit over an interfacing link into modulated digital signals, the interfacing link having a bandwidth less than the rate of transmission by the network interface over the communication network, and transmitting digital signals including the modulated digital signals on the communication network;

wherein the method further comprises:

in the data processing unit, generating transmission packets for the network interface that contain both raw digital signals and applicative digital signals; and in the network interface, combining raw digital signals received from the data processing unit and generated modulated digital signals into the digital signals to transmit on the communication network.

The methods have similar advantages than the above communication devices.

Another aspect of the invention relates to a non-transitory computer-readable medium storing a program which, when executed by a microprocessor or computer system in a communication device of a communication network, causes the communication device to perform the steps of any of the above-defined methods.

The non-transitory computer-readable medium may have features and advantages that are analogous to those set out above and below in relation to the methods for processing data, in particular that of making it possible to exchange high rate data between two OSI layers over a limited-bandwidth interface, while continuously processing payload data transmitted over the same interface.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1 schematically illustrates a conventional wireless communication device;

FIG. 1a schematically shows an example of a digital signal received or generated by the wireless communication device of FIG. 1;

FIG. 1b schematically illustrates the processing by the PHY layer and synchronization of communication over the MAC/PHY interface in the wireless communication device of FIG. 1;

DETAILED DESCRIPTION OF EMBODIMENTS OF THE INVENTION

Figure 2:
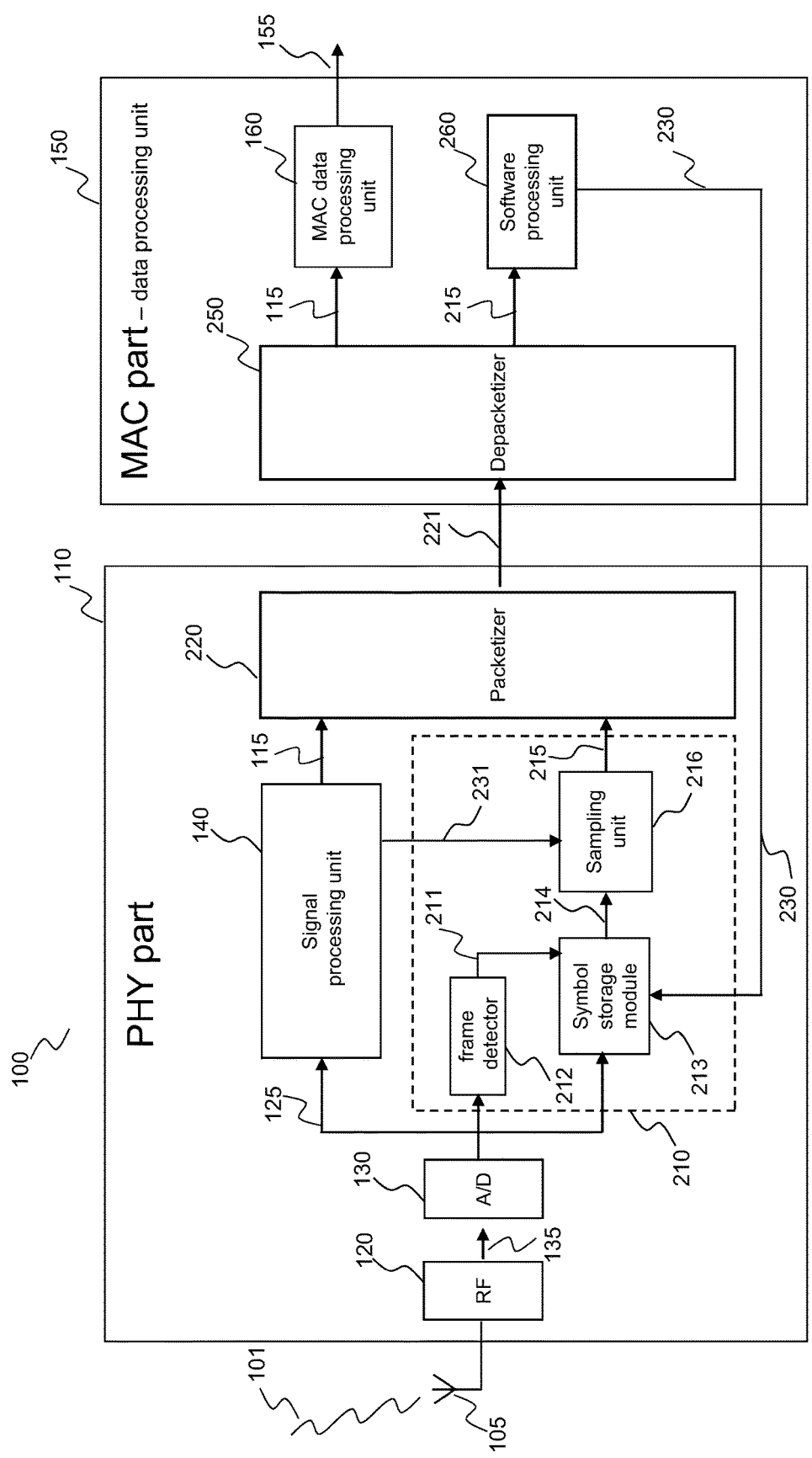
FIG. 2 schematically illustrates a wireless communication device having receiving mechanisms according to the invention.

The invention regards communication devices, and corresponding methods of processing data, which operates as a receiving entity and/or as a transmitting entity on a communication network.

As a receiver, the communication device comprises a signal processing unit configured to demodulate symbols of a received digital signal into payload data to be provided to a data processing unit through an interfacing link, the received digital signal being made of raw data.

As a transmitter, the communication device comprises a data processing unit configured to obtain payload data to be provided to a signal processing unit through an interfacing link; and a signal processing unit configured to modulate the received payload data into modulated symbols of a digital signal to be transmitted over the communication network.

Modulation of applicative or "payload" data is a widely-known technique of processing data before they are sent over the communication network. Examples of modulation techniques are amplitude-shift keying (ASK), frequency-shift keying (FSK) and phase-shift keying (PSK). One common example of ASK is quadrature-amplitude modulation (QAM). Two common examples of PSK are binary phase-shift keying (BPSK) and quadrature phase-shift keying (QPSK).

Any kind of communication network may be involved in the context of the invention. Preferably, the communication network is a wireless network, for example a WPAN 60-GHz-based home networks such as an 802.11-compliant network, an 802.15.3c-based network, a Wireless HD network or a WiGiG network.

FIG. 1 schematically illustrates a conventional wireless communication device 100. In particular, FIG. 1 shows the lowest OSI layers that operate when the communication device communicates on the network, namely the PHY layer and the MAC sub-layer belonging to the Data Link layer.

The communication device 100 comprises an antenna 105 to the network medium (the air in the present example), a first part 110 implementing the PHY layer and a second part 150 implementing the MAC sub-layer.

The PHY part 110 and the MAC part 150 are linked through a bi-directional (two-way) interfacing link, referred to as MAC/PHY interface or link, made of the two arrows 115 (when the device 100 operates as a receiver) and 116 (when the device 100 operates as a transmitter). Depending on how the two parts 110 and 150 are designed as two separate hardware parts, the interfacing link 115/116 may be a wire link with or without connectors, a chip-to-chip interface or an internal link inside an integrated circuit.

The MAC part 150 can communicate with upper OSI sub-layers and layers, in particular with an application of the OSI application layer, through the links 155/156. The invention is regardless whether all or parts of the upper OSI sub-layers and layers are implemented in the same hardware as the MAC part 150 or in other hardware. As being an intermediary part in the processing of data, the MAC part 150 forms a data processing unit.

When operating as a receiver, the PHY part 110 processes a radio analogue signal 101 received through the antenna 105 and provides "payload" data 115 to the MAC part 150.

The MAC part 150 performs the required adaptation on the received payload data 115 in order to match the upper layer data presentation. The MAC part 150 then supplies the received adapted payload data, i.e. application data, to the upper layer.

The PHY part 110 includes a radiofrequency transceiver 120 which converts the radio analogue signal 101 into baseband analogue signals 135.

The PHY part 110 also includes an analog-to-digital (A/D) converter 130 to convert the baseband analogue signals 135 into digital signals 125.

FIG. 1a schematically shows an example of a digital signal 125. It is made of digital data, referred to as "raw data" since they are directly retrieved from the transmitted data through the wireless medium without any specific digital processing.

The raw data comprise consistent sets of raw data representing modulation symbols SYM. They may also comprise consistent sets of raw data specific to the PHY layer, for example additional signals, such as preamble information (e.g. synchronizing pattern or any type of preamble) and postscript information (e.g. training pattern).

Each consistent set of raw data is meaningful for the devices. In the figure, "preamble" and "training" are two separate consistent items of PHY-layer information, that each has a meaning for the devices.

Back to FIG. 1, the PHY part 110 also includes a signal processing unit 140 that receives the digital signals 125 and outputs the payload data 115 resulting from the processing of the digital signals 125. The payload data 115 are transmitted to the MAC part 150 over the MAC/PHY interface.

The signal processing unit 140 is in charge of synchronizing, demodulating and decoding the received symbols SYM of the digital signals 125. The symbols are demodulated and decoded according to the modulation scheme used at the PHY layer of the transmitter. They results in decoded symbols that are payload data 115 because they represents a binary stream of decoded data intelligible for the next layer.

FIG. 1b schematically illustrates the processing by the PHY part 110 and synchronization of communication over the MAC/PHY interface. Indeed, the signal processing unit 140 controls synchronization between the digital signals 125 having a high bitrate and transmission packets over the MAC/PHY interface which have a lower bitrate.

The received radio analog signal 101 is converted into a series of symbols SYM. Each symbol has a respective length of time ("symbol time", the width of each symbol on the figure) corresponding to the time necessary to transmit/receive this symbol over the communication network. This length of time directly depends on the binary length of the symbol and of the bandwidth or binary rate of the communication network.

The signal processing unit 140 then generates the decoded symbols, namely the payload data 115 which each comprise less binary data (thus has a lower data rate) than the symbol before demodulation and decoding. As introduced above, this may be because of the reliability mechanisms implemented in lowest layers of the OSI model that can increase the bitrate from a few Gbps to 50 Gbps.

FIG. 1b also shows a transmission packet TP used to transmit payload data over the MAC/PHY interface. It has the same length of time than each symbol, but has less capacity since the MAC/PHY interface has generally a limited bandwidth which is less than the bitrate of the received digital signals 125, i.e. of the PHY part 110. It is generally the bandwidth (or bitrate) that is handled by the MAC part 150.

In particular, the maximum bandwidth of the MAC/PHY interface is designed to support at least the maximum payload data rate corresponding to the highest code rate implemented by the PHY layer and supported by the MAC layer. This ensures that any decoded symbol, i.e. payload data, may be included in a single transmission packet used to exchange data over the MAC/PHY interface. This also ensures in the transmitting operational mode that the payload data included in a transmission packet can be converted into a symbol for transmission over the communication network.

The transmission packet TP may comprise headers and delimiters (flags) in addition to the payload data to be transmitted to the MAC part 150. When the payload data do not fill the whole transmission packet TP of defined time length, padding is provided.

The MAC part or data processing unit 150 processes the received payload data 115 at the MAC data processing unit 160 which are converted into application data 155 for the next upper layer. MAC processing may comprise detecting transmission frames from the binary payload data, check transmission errors using checksums for example, remove padding from the received payload data to obtain application data; remove and check MAC address to decide between forwarding the application data, etc.

Reversely, when operating as a transmitter, the MAC part 150 performs required adaptation on application data 156 received from an upper layer, in order to match the lower layer data presentation. The MAC part 150 thus generates payload data 116 that are then supplied to the lower layer, namely the PHY layer, through the MAC/PHY interface.

The PHY part 110 then processes the received payload data 116 to provide a radio analogue signal 101 to the antenna 105.

The MAC part 150 receives application data 156 from an upper layer. The MAC data processing unit 160 within the MAC part 150 processes the application data 156 to generate payload data 116. MAC processing may comprise inserting specific binary flags to delimit transmission frames in the binary payload data, appending checksums for check transmission errors at the receiver, appending preamble and padding; appending addressee MAC address to each transmission frame, etc.

The payload data 116 are transmitted over the MAC/PHY interface to the PHY part 110. The scheme of FIG. 1b also applies from the bottom to the top.

The signal processing unit 140 receives the payload data 116 and outputs digital signals 126 resulting from the processing of the payload data 116.

The signal processing unit 140 is in charge of synchronizing, modulating and encoding the received payload data 116 into symbols SYM of the digital signals 126. To do so, the signal processing unit 140 selects one or several modulations to be applied to the received payload data 116.

The generated symbols SYM form the digital signals 126. Optionally, the signal processing unit 140 may add additional information, namely raw data, in the digital signals 126 as shown in FIG. 1a.

The digital signals 126 are transmitted to a digital-to-analog (D/A) converter 130 to generate baseband analogue signals 136.

The baseband analogue signals 136 are input to the radiofrequency transceiver 120 to generate the radio analogue signal 101 to the antenna 105 for transmission over the wireless communication network.

The PHY part 110 as explained above thus operates as a network interface for the communication device 100.

FIG. 2 schematically illustrates a wireless communication device 100 having receiving mechanisms according to the invention.

Figure 3:
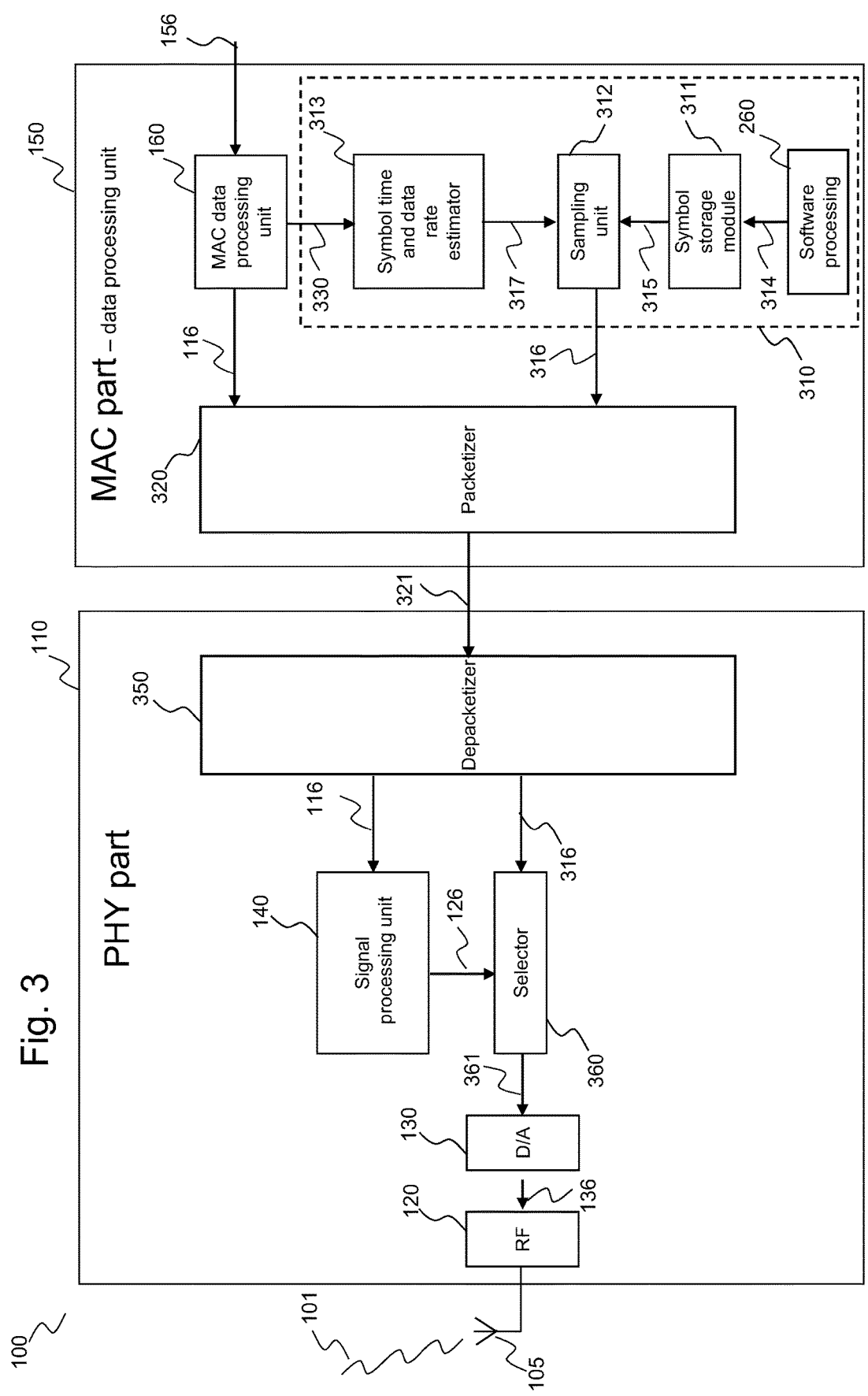
FIG. 3 schematically illustrates a wireless communication device having transmitting mechanisms according to the invention.

FIG. 3 schematically illustrates a wireless communication device 100 having transmitting mechanisms according to the invention.

The same blocks as in FIG. 1 have the same numeric references in the figures.

The same wireless communication device 100 may implement the receiving mechanisms of FIG. 2 and the transmitting mechanisms of FIG. 3.

A wireless communication receiver of FIG. 2 comprises
a bandwidth determining module configured to determine available bandwidth in a transmission slot TS allocated to one symbol of the received digital signal 125 for transmitting corresponding payload data 115 through the interfacing link;
a sampler configured to select non-demodulated data (e.g. raw data) that correspond to the determined available bandwidth, from amongst raw data of the received digital signal and data generated from raw data of the received digital signal using no demodulation;
a multiplexer configured to combine the selected non-demodulated data with the payload data corresponding to the one symbol into the same transmission packet to be provided to the data processing unit (or MAC part) in the transmission slot over the interfacing link.

This makes it possible for the receiver 100 to keep going on the conventional processing of payload data (continuous stream of video data for example) while providing the upper layer (MAC sub-layer) with PHY-layer data, namely non-demodulated data, for the upper layer to conduct specific signal processing based on PHY-layer data.

In addition, the sampler makes it possible to implement this approach regardless the bandwidth or bitrate difference between the data internal to the PHY layer and the data internal to the upper layer. Indeed, the sampler is configured to select an appropriate amount of non-demodulated data given the available bandwidth over the MAC/PHY interface.

This is now described with more details.

Non-demodulated data includes raw data as received and/or data generated from such received raw data using no demodulation.

Below, preference is given for the description to the raw data as received in the digital signal 125.

Examples are also given below in cases where such raw data are processed excluding demodulation to generate PHY-layer internal non-demodulated data before the generated data are transmitted to the Data Link (e.g. MAC) layer using the teachings of the invention.

Part of the process within the PHY part 110 and the MAC part 150 is the same as in FIG. 1. As to the PHY part 110, the radio analogue signal 101 is received through the antenna 105, converts into baseband signals 135 by the radiofrequency transceiver 120. The baseband signals 135 are then converted, by the A/D converter 130, into digital signals 125 made of raw data including symbols SYM. The digital signals 125 are provided to the signal processing unit 140 which performs synchronization, demodulation and decoding. This results into payload data 115 to be provided to the MAC part 150.

The raw data of the digital signals 125 are also supplied to a raw data selector 210 configured to select raw data from the received digital signal that are to be provided to the data processing unit or MAC part 150, for example preamble or training information of the digital signal.

The raw data selector 210 outputs the selected raw data 215 which are input to a packetizer 220 together with the payload data 115 from the signal processing unit 140. To be noted that the selected raw data 215 are sampled at the MAC/PHY interface bitrate, since the MAC/PHY has a bandwidth or bitrate less than the rate of the received digital signal 125.

Packetizer 220 operates as a multiplexer and combines the selected raw data 215 with the payload data 115 corresponding to one symbol into the same transmission packet TP. Said transmission packet TP is ready to be transmitted over the MAC/PHY interface to the data processing unit (or MAC part) 150.

The selected raw data 215 may be any raw data in the received digital signals 125, e.g. a header, a specific flag or signal (series of bits), a code-error binary field, etc.

In one main embodiment that is mainly described below, the selected raw data 215 are preferably selected from raw data of the received digital signal 125 that represent a symbol to be demodulated in the received digital signal 125 by the signal processing unit 140. That means that a copy of the received digital signal 125 is provided to the raw data selector 210. A signal copy function (not shown) is thus implemented in the communication device 100.

To perform selection of raw data, the raw data selector 210 receives as input a symbol selection signal 230 from the data processing unit 150 and a data rate signal 231 from the signal processing unit 140.

The symbol selection signal 230 may include an index of a first symbol to select and a number of symbols to select within the received digital signals 125.

The raw data selector 210 is thus able to select symbols in the received digital signal 125 based on the received symbol selection signal 230 and on a data frame start signal 211 generated by a frame detector 212. This provides symbols to be transmitted to the MAC part 150.

The code rate signal 231 may indicate the code rate experienced by the signal processing unit 150 in the process of demodulating and decoding the current symbol SYM. Signal 231 is synchronized with the timing of the symbols SYM (symbol time) within the received digital signals 125 (signal 231 is updated at each new symbol SYM being processed). That means that signal 231 reflects the amount of payload data for the current symbol that will have to be transmitted to the MAC part 150. As explained below, signal 231 will help the raw data selector 210 to select the right amount of raw data to fill as best as possible the current shared transmission packet TP.

The raw data selector 210 is thus able to select raw data at a data rate complementary to the data rate of the received code rate signal 231, given a data rate (i.e. bandwidth) of the interfacing link.

Of course, the complementary data rate would generally intend to reach the maximum data rate of the interfacing link in order to fully exploit the shared transmission packets TP as explained below. The complementary data rate is thus equal to the maximum data rate supported by the MAC/PHY interface minus the current data rate used to demodulate the current symbol.

In particular, it selects (i.e. sampled) raw data at the complementary data rate from among the above selected symbols. In other words, the selection of raw data is made of two selection sub-steps, one to select symbols from the received digital signal 125 and a second one to select raw data from the selected symbols (from the raw data representing such symbols). The second selection thus represents consumption of the selected symbols at a data rate corresponding to the instant bandwidth available over the MAC/PHY interface.

In details, the raw data selector 210 includes a frame detector 212 and a symbol storage module 213 that both received a copy of the digital signals 125.

The frame detector 212 determines which symbols in the received digital signals 125 correspond to a start of a data frame, in particular a MAC frame. The determination may rely on comparing symbols in the received digital signals 125 with predefined symbols that represent frame delimitation flags. Alternatively, it may involve correlation detection (auto-correlation or cross-correlation) based on a level threshold and/or specific raw data value.

The frame detector 212 outputs a data frame start signal 211 to the symbol storage module 213.

The symbol storage module 213 takes into account the data frame start signal 211 and the symbol selection signal 230 from the data processing unit 150 to select and store raw data 214 from the received digital signals 125. In particular, it stores raw data representative of the symbols indicated in the symbol selection signal 230. The data frame start signal 211 helps the symbol storage module 213 to synchronize its detection of symbols with the start of a frame, since the symbol selection signal 230 defines the symbols to be selected from a start-of-symbol index and a number of symbols.

In one embodiment, the symbol storage module 213 may implement a sub-sampling function (either in data frequency or in data resolution) in order to reduce the amount of raw data to store. For example the data resolution of the raw data may be down-sampled from 10-bit data in the digital signals 125 to 2-bit data (e.g. the most significant bits) to be stored in 213. Another illustrative example provides a frequency down-sampling of the digital signals 125, for example by a ratio equal to 1/10 from 5 giga-samples/s in the signals 125 to 500 mega-samples/s as stored in 213. Such function may be continuously active or active only when the free memory space in 213 becomes lower than a predefined threshold.

The raw data selector 210 also includes a sampling unit 216 that receives the data rate signal 231 and has access to the symbol storage module 213 to consume stored raw data corresponding to selected symbols SYM. The sampling unit 216 is synchronized with the symbol timing, thus outputting selected raw data 215 to the packetizer 220 for each symbol time.

Due to consumption of raw data in the symbol storage module 213, the symbol storage module 213 is preferably of first-in-first-out (FIFO) memory type.

The sampling unit 216 has two functions.

A first function is a bandwidth determining module to determine available bandwidth in a transmission slot or packet TP allocated to one symbol of the received digital signal for transmitting corresponding payload data through the interfacing link. The first function operates at the symbol-time cadence. This is to know the room available in the next transmission packet TP in order to fill it with the most of raw data stored in the symbol storage module 213. To perform this function, the sampling unit 216 uses the data rate signal 231 in order to determine the above-mentioned complementary data rate given the bandwidth or data rate of the MAC/PHY interface.

A second function is a sampler to select raw data from the symbol storage module 213 that correspond to the complementary data rate determined from the data rate signal 231, for each successive symbol time. This corresponds to the bandwidth that can be determined as available over the MAC/PHY interface for the next transmission packet TP.

In another embodiment, a non-demodulated data storage module may be provided, e.g. appended to module 213, to receive and store data generated from the received raw data using no demodulation. Thus selection of non-demodulated data to be transmitted to the MAC part 150 can be performed using each one or both of the two storage modules.

Figure 4:
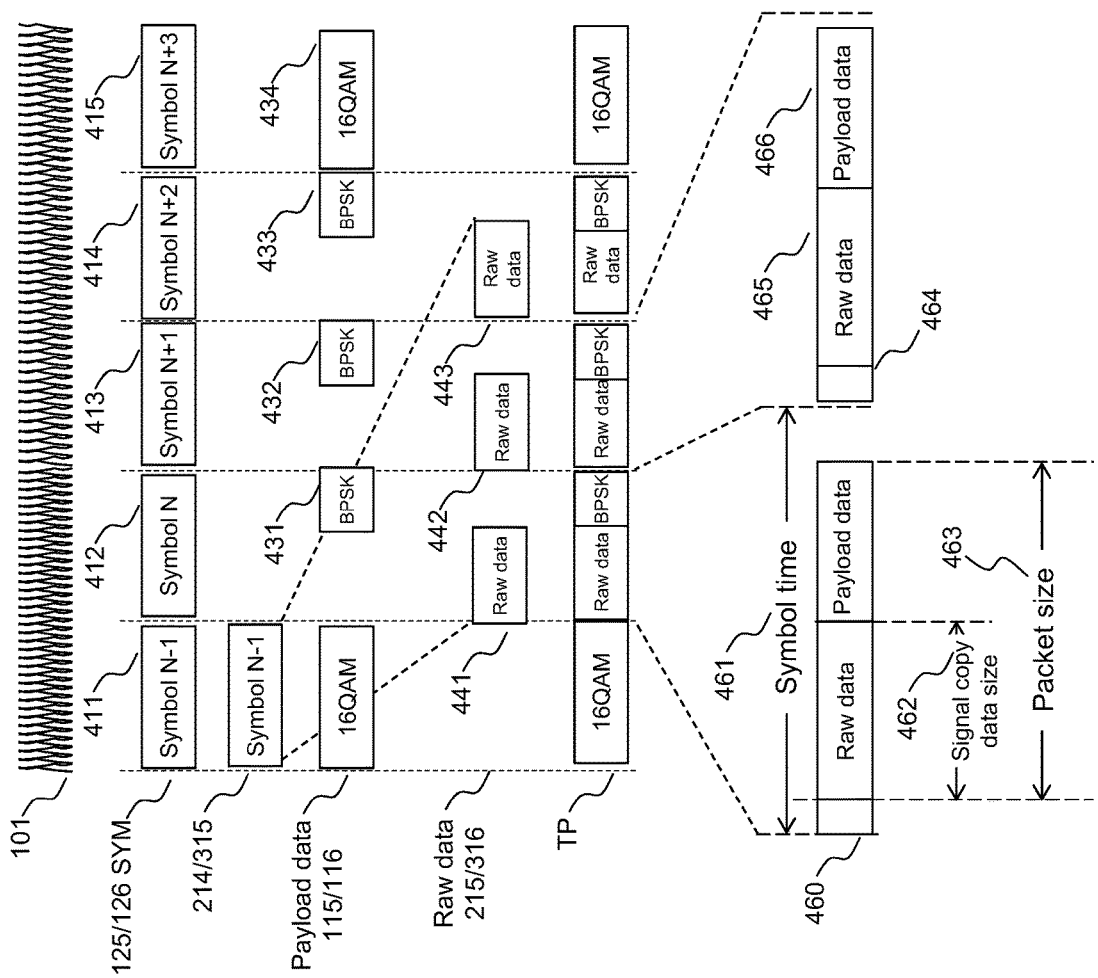
FIG. 4 illustrates the mechanisms implemented in the wireless communication devices of FIGS. 2 and 3.

FIG. 4, further described below, illustrates the operations of the sampling unit 216 using similar drawing as FIG. 1b. Symbol SYM N−1 is selected by the sampling unit 216 as a selected symbol 214 and stored in the symbol storage module 213.

When 140 processes the current symbol SYM N (i.e. demodulates and decodes), the data rate signal 231 is produced that represents the data rate of the payload data 431 obtained. The sampler of the sampling unit 216 then selects a first part of the raw data representing the selected symbol 214 given the data rate complementary to 231, given the MAC/PHY bandwidth. This provides the first part 441 as shown on the figure. That first part 441 is input to the packetizer 220.

When 140 processes the next symbol SYM N+1, the data rate signal 231 has been updated given the new payload data 432 obtained. The sampler of the sampling unit 216 then selects a second part of the raw data (the first data in the FIFO memory 213) representing the selected symbol 214 given the data rate complementary to updated 231, given the MAC/PHY bandwidth. This provides the second part 442 as shown on the figure. That second part 442 is input to the packetizer 220.

And so on for the next symbol SYM N+2 and third part 443 of raw data.

Parts 441, 442, 443 of raw data form the selected raw data 215 provided to the packetizer 220. As shown, the raw data representing the same symbol are split over several transmission slots on the interfacing link.

As an example, three code rates may be considered by the signal processing unit 140 to achieve three different data rates: 1 Gbps, 2 Gbps and 4 Gbps. In addition, the MAC/PHY interface is designed with a maximum data rate of 5 Gbps.

For each code rate implemented by 140, a complementary code rate for the sampling unit 216 is computed as follows.

If the current code rate is 1 Gbps, the sampling of 214 by 216 is done at 5 Gbps−1 Gbps=4 Gbps during one symbol time (the current symbol).

If the current code rate is 2 Gbps, the sampling of 214 by 216 is done at 5 Gbps−2 Gbps=3 Gbps during one symbol time.

If the current code rate is 4 Gbps, the sampling of 214 by 216 is done at 5 Gbps−4 Gbps=1 Gbps during 1 symbol time.

And each time symbol, the sampling unit 216 is refined according to the following formula: complementary data rate=(MAC/PHY interface maximum rate)−(data rate used to demodulate the current symbol).

The same way to determine the available bandwidth can be described with respect to the length of time for data given the bandwidth over the MAC/PHY interface.

The transmission slot/packet allocated to the current symbol over the interfacing link (to transmit corresponding payload data) has the same length of time (i.e. symbol time) as the length of time of the current symbol in the received digital signal 125. This ensures efficient synchronization between the PHY layer and the MAC/PHY interface to be obtained.

In FIG. 4, this time length matching is illustrated through the same width taken by the depicted symbols SYM and the transmission packets TPs.

Given this definition of the time length, the bandwidth determining module of the sampling unit 216 determines the length of time allocated to the payload data 431 in the transmission slot, based on the interfacing link bandwidth and a code rate of the payload data; and determines a second length of time corresponding to the remaining time in the transmission slot. The remaining time corresponds to the available bandwidth for the current symbol. In FIG. 4, it corresponds to the space not used by the payload data 115 in the transmission packet TP.

According to the present invention, this available bandwidth is used to transmit, together with payload data 115 for a current symbol, selected raw data 215. Both data are multiplexed together within the same transmission packet TP by a multiplexer, shown in FIG. 2 through packetizer 220.

Packetizer 220 generates a transmission packet TP for the transmission slot allocated to the current symbol SYM N, the transmission packet being made of two successive portions, a first portion including the selected raw data 441 and a second portion including the payload data 431 corresponding to the current symbol SYM N. This is illustrated in FIG. 4, but other implementation can be used. For example, the payload data can be prior to the raw data (opposite to the figure). In another example, one or several first portions within the same TP can be provided to convey the raw data, while one or several second portions within the same TP can be provided to convey the payload data. This only corresponds to splitting those data within the TP.

The generated transmission packet TP is then transmitted to the MAC part 150 over the MAC/PHY interface. The transmitted TPs form signal 221 shown in FIG. 2.

The MAC part 150 includes a depacketizer 250 that receives signal 221 as input. The depacketizer 250 de-multiplexes the received TPs, i.e. retrieves the payload data 115 and the raw data 215 (or non-demodulated data) from every received transmission packet. It then forwards the payload data 115 to the MAC data processing unit 160 for appropriate processing before transmission to an upper layer application and forwards the raw data 215 to a software processing unit 260.

In particular, as a conventional scheme, the MAC data processing unit 160 converts the payload data 115 into application data 155 for the next upper layer. MAC processing may comprise detecting transmission frames from the binary payload data, check transmission errors using checksums for example, remove preamble and padding from the received payload data to obtain application data; remove and check MAC address to decide between forwarding the application data, etc.

The non-demodulated data as received from the PHY part 110 are not data forming part of a Data Link frame (i.e. of a protocol data units for a protocol implemented in the OSI Layer 2, e.g. of a MAC frame), contrary to the payload data.

The software processing unit 260 performs specific signal processing based on the received raw data 215, some example of which being given below with reference to FIG. 5.

In addition, the software processing unit 260 generates the symbol selection signal 230 adapted for the specific signal processing to perform. As an example already introduced above, the symbol selection signal 230 may identify a start-of-symbol index and a number of symbols to be stored. The software processing unit 260 thus configures the symbol storage module 213 to select relevant part of the raw data (or non-demodulated data) in the received digital signals 125.

For example, the symbol selection signal 230 may control the symbol storage module 213 to select the two first symbols SYM (start-of-symbol index=1 and number of symbols=2) to ensure copy of the preamble information to be performed. The raw preamble information can be used by the MAC layer to perform an analysis of the receiving power levels.

In another example, the training pattern in the digital signals 125 (the last symbols in the digital signals, i.e. symbols that do not comprise payload or "useful" data) can be retrieved to perform a channel probing or a measure of antenna aiming quality. The knowledge of such training pattern can be inferred by the software processing unit 260 from the MAC header previously received that described the structure of the received MAC frame. In this example, the start-of-symbol index is equal to the size of the preamble+ the size of the payload data (given the code rate)+1, and the number of symbols equals the training pattern size as defined in the MAC frame.

In a wireless communication transmitter of FIG. 3, the data processing unit 150 comprises:

a raw data generator configured to generate raw data;

a bandwidth determining module configured to determine available bandwidth in a transmission slot used to transmit, through the interfacing link, payload data 116 corresponding to one modulated symbol SYM;

a sampler configured to select generated raw data corresponding to the determined available bandwidth;

a multiplexer configured to combine the selected raw data with the payload data 116 corresponding to the one modulated symbol into the same transmission packet TP to be provided to the signal processing unit 140 in the transmission slot over the interfacing link.

In addition, the signal processing unit 140 includes the raw data as received from the data processing unit in the digital signal 126 together with the one modulated symbol.

This makes it possible for the MAC part 150 of the transmitter 100 to generate and transmit raw data to be directly inserted in the output digital signals 126, while keeping going on the conventional processing of the application data (e.g. video data in streaming).

This is now described with more details.

Part of the process within the PHY part 110 and the MAC part 150 is the same as in FIG. 1. As to the MAC part 150, application data 156 for an upper layer application are received from an upper layer and are consumed by the MAC data processing unit 160 which adapts them into payload data 116, in order to match the lower layer data presentation. This results into payload data 116 to be provided to the PHY part 110.

In parallel, a raw data generator and selector 310 in the MAC part 150 is configured to generate raw data and to select part of the generated raw data to be provided to the signal processing unit or PHY part 110 at each transmission packet TP.

Such raw data do not form part of a Data Link or MAC frame.

The raw data generator and selector 310 outputs selected raw data 316 which are input to a packetizer 320 together with the payload data 116 from the MAC data processing unit 160. To be noted that the selected raw data 316 are sampled at the MAC/PHY interface bitrate, since the MAC/PHY has a bandwidth or bitrate less than the rate of the digital signals lastly generated by the PHY part 110.

Packetizer 320 operates as a multiplexer and combines the selected raw data with the payload data 116 corresponding to one modulated symbol into the same transmission packet TP to be provided to the signal processing unit 140 through the interfacing link. Said transmission packet TP is ready to be transmitted over the MAC/PHY interface to the signal processing unit 140 (or PHY part 110). This maintains the communication established by the application providing the application data.

The raw data 316 may be any kind of data for the digital signals to be input to the D/A converter 130. Preferably, the selected raw data 316 are symbols already modulated according to a modulation also implemented by the signal processing unit 140. Such modulation may be software-implemented within the raw data generator and selector 310.

To perform selection of raw data, the raw data generator and selector 310 receives as input a signal 330 from the MAC data processing unit 160. Signal 330 indicates when a start of frame (in particular MAC data frame) occurs in the MAC data processing unit 160. It may also indicate the code rate that will be used by the signal processing unit 140 to process the payload data being transmitted over the MAC/PHY interface. The raw data generator and selector 310 uses such information to compute the complementary data rate and to select appropriate generated raw data as explained below.

In details, the raw data generator and selector 310 includes a software processing unit 260, a symbol storage module 311, a sampling unit 312 and a symbol time and data rate estimator 313.

Software processing unit 260 generates raw data 314 to be directly added to the digital signals (i.e. without modulation and encoding) by the PHY part 110.

Examples of raw data 314 are given below with reference to FIG. 5.

Raw data 314 may already be symbols.

They are stored in symbol storage module 311. The symbol storage module 311 is preferably of first-in-first-out (FIFO) memory type.

Sampling unit 312 has access to the symbol storage module 311 to select stored raw data 315 from the latter, by consuming such raw data 315.

The sampling unit 312 is synchronized with the symbol timing implemented at the PHY part 110, thus outputting selected raw data 316 to the packetizer 320 for each symbol time. To ensure synchronization, the sampling unit 312 is driven by a data rate signal 317 provided by symbol time and data rate estimator 313, for every symbol time.

Symbol time and data rate estimator 313 estimates the symbol time and the current data rate which is currently used by the signal processing unit 140 of the PHY part 110 to modulate the payload data 116 delivered by the MAC data processing unit 160. It provides the result as signal 317.

The current data rate can be estimated through simulation of the modulation and encoding processes provided at the signal processing unit 140 on the payload data 116 being produced at the MAC data processing unit 160 (see arrow 330). Simulation is to reproduce the behavior of the signal processing unit 140 to accurately estimate the current data rate for each generated payload data 116, given the symbol time and the code rate.

Knowing the symbol time (or length of time for a symbol to be transmitted in the digital signals 126) and the current data rate, the sampling unit 312 is ready to determine available bandwidth and to select an appropriate amount of raw data from symbol storage unit 311.

Similar to sampling unit 216, sampling unit 312 has two functions: a first one operating at the symbol-time cadence as a bandwidth determining module to determine available bandwidth in a transmission slot/packet TP used to transmit, through the interfacing link, payload data 116 corresponding to a currently modulated symbol SYM; and a second one operating as a sampler to select generated raw data 315 from the symbol storage module 311 corresponding to the determined available bandwidth.

Signal 317 may comprise the estimated data rate for the modulated symbols, in which case the sampler may select (i.e. sample) raw data from 311 at the data rate complementary to the estimated data rate, given the (maximum) bandwidth or data rate of the MAC/PHY interface. The selected raw data form signal 316 input to the packetizer 320.

The above blocks of MAC part 150 controls the generation of raw data 316 at specific times, which specific times are delivered by estimator 313 based on start-of-frame signal 330. The specific time may include the amount of raw data to be selected by the sampling unit 312 for the current symbol time (corresponding to a single transmission packet TP) or any information enabling such amount of raw data to be determined. The sampling of raw data at the sampling unit 312 makes it possible to select the exact amount of raw data from the symbol storage module 311.

The short explanation given above with reference to FIG. 4 also applied but in the reverse way (from bottom to top). This illustrates the processing at the signal processing unit 140, thereby illustrating how estimator 313 can estimate the symbol time and the current data rate.

Taking the same example as above where three code rates are considered by the signal processing unit 140 to achieve three different data rates: 1 Gbps, 2 Gbps and 4 Gbps, and where the MAC/PHY interface is designed with a maximum data rate of 5 Gbps, a complementary code rate for the sampling unit 312 is computed for each code rate implemented by 140, as follows.

If the current code rate is 1 Gbps, the sampling of 315 by 312 is done at 5 Gbps−1 Gbps=4 Gbps during one symbol time (the current symbol). If the current code rate is 2 Gbps, the sampling of 315 by 312 is done at 5 Gbps−2 Gbps=3 Gbps during one symbol time. If the current code rate is 4 Gbps, the sampling of 315 by 312 is done at 5 Gbps−4 Gbps=1 Gbps during 1 symbol time.

And each time symbol, the sampling unit 312 is refined according to the following formula: complementary data rate=(MAC/PHY interface maximum rate)−(data rate used to modulate the current payload data).

The same way to determine the available bandwidth can be described with respect to the length of time for data given the bandwidth over the MAC/PHY interface.

The transmission slot/packet allocated to transmit payload data corresponding to the current symbol over the interfacing link has the same length of time (i.e. symbol time) as the length of time of the current modulated symbol in the digital signal to be transmitted over the communication network. This ensures efficient synchronization between the PHY layer and the MAC/PHY interface to be obtained.

In FIG. 4, this time length matching is illustrated through the same width taken by the depicted symbols SYM and the transmission packets TPs.

Given this definition of the time length, the bandwidth determining module estimates a code rate at which the payload data are modulated by the signal processing unit, estimates a length of time allocated to the payload data in the transmission slot, based on the interfacing link bandwidth and the estimated code rate of the payload data; and determines a second length of time corresponding to the remaining time in the transmission slot. The remaining time corresponds to the available bandwidth for the current transmission packet TP. In FIG. 4, it corresponds to the space not used by the payload data 116 in the transmission packet TP.

According to the present invention, this available bandwidth is used to transmit, together with payload data 116 for a current symbol, selected raw data 316. Both data are multiplexed together within the same transmission packet TP by a multiplexer, shown in FIG. 3 through packetizer 320.

Packetizer 320 generates a transmission packet for the transmission slot allocated to the payload data corresponding to a symbol to be modulated (symbol being generated by 160), the transmission packet being made of two successive portions, a first portion including the selected raw data and a second portion including the payload data corresponding to the one symbol.

Bottom of FIG. 4 shows a resulting TP.

As for the receiver, any consistent set of raw data (e.g. a specific flag or series of bits that are intrinsically meaningful for an addressee communication device) as produced by software unit 260 may be split over several transmission slots on the interfacing link.

The generated transmission packet TP is then transmitted to the PHY part 110 over the MAC/PHY interface. The transmitted TPs form signal 321 shown in FIG. 3.

The PHY part 110 includes a depacketizer 350 that receives signal 321 as input. The depacketizer 350 de-multiplexes the received TPs, i.e.

retrieves the payload data 116 and the raw data 316 from every received transmission packet TP. It then forwards payload data 116 to the signal processing unit 140 for modulation and encoding, and raw data 316 to a selector buffer (not shown).

In particular, as a conventional scheme, the signal processing unit 140 receives the payload data 116, modulates and encoded them into symbols SYM, and outputs digital signals 126 resulting from the processing of the payload data 116. When selected by selector 360, the digital signals 126 (part of signal 361 in the figure) are transmitted to the digital-to-analog (D/A) converter 130 to generate baseband analogue signals 136. The baseband analogue signals 136 are input to the radiofrequency transceiver 120 to generate the radio analogue signal 101 to the antenna 105 for transmission over the wireless communication network.

The selector buffer may be a buffer implemented within selector 360.

Selector 360 received signals 126 (modulated symbols at high data rate, e.g. 50 GHz) and signals 316 (raw data which are processed at the same high data rate in PHY part 110).

Selector 360 selects data to include in the digital signal 361 to be transmitted over the communication network (after D/A conversion) between the modulated symbols 126 provided by the signal processing unit 140 and the raw data 316 in the selector buffer.

In practice, selector 360 may decide to forward either digital signals 126 (i.e. symbols) when they are provided by signal processing unit 140 or the depacketized raw data 316 if when the signal processing unit does not provide a modulated symbol to selector 360.

As it transpires from this explanation, the selection by selection 360 is based on the activity of the signal processing unit 140. If the signal processing unit 140 is active and ready to deliver some digital signals 126 (i.e. symbols), select 360 transfers digital signals 126 to the DAC 130 through signals 361. If the signal processing unit 140 is inactive, elector 360 transfers raw data 316 to the DAC 130 through signals 361.

In other words, the raw data 316 are inserted, as stored in the buffer (i.e. without additional encoding/modulation compared to how they were transmitted in the TP), each time a symbol time in digital signals 361 is not used to transmit a modulated symbol of unit 140.

Back to FIG. 4 that illustrates the above-described mechanisms, signal 101 is the analogue signal received by device 100, and corresponds to signals 135 and 136.

Signal 410 is the digitalized signal of signal 101. This signal 410 is represented split into symbols SYM (from symbol 411 up to symbol 415) as is it processed/generated by the signal processing unit 140.

The next line in the figure is signals 214/315 representing one symbol stored in the symbol storage module 213/311.

The next line in the figure is signals 115/116 representing the payload data

The symbols and the payload data are associated through the modulation/demodulation and encoding/decoding processes implemented by the signal processing unit 140.

It can be observed that, for a specific symbol time 461, a specific amount of payload data 431 is exchanged on signals 115 and 116.

This assumption may be also done on an average of data rate as illustrated for a peak rate. The peak rate illustration is preferred to make the description of the invention simpler. In particular, the invention also applies if the MAC/PHY interface current data rate follows the current code rate in average.

Next in the figure, signals 215/316 illustrate the selected raw data over the time, as produced by the raw data selector 210 or the raw data generator and selector 310. Signals 441, 442 and 443 are the results of the sampling of stored symbols 214/315 performed by the sampling unit 216/312.

As shown in the figure, signal 441, a sub part of symbol 214/315, is complementary in time to signal 431, given the time length of the transmission packet TP. The invention provides an efficient way to construct signal 441, i.e. to select raw data to be combined with signal 431 within the same TP, in view of optimizing the use of the MAC/PHY interface bandwidth.

In the same manner, signal 442 is built according to signal 432, and signal 443 is built according to signal 433.

Finally, signals 115/116 and 215/316 are multiplexed in order to build the content of the transmission packets TPs transmitted over the MAC/PHY interface.

A possible transmission packet format 460 is illustrated.

This transmission packet 460 is composed of the previously information, raw data 465 and payload data 466, to which a header 464 is added including the raw data size 462 and packet size 463, in order to make it possible for de-packetization of the transmission packet without ambiguity.

Figure 5:
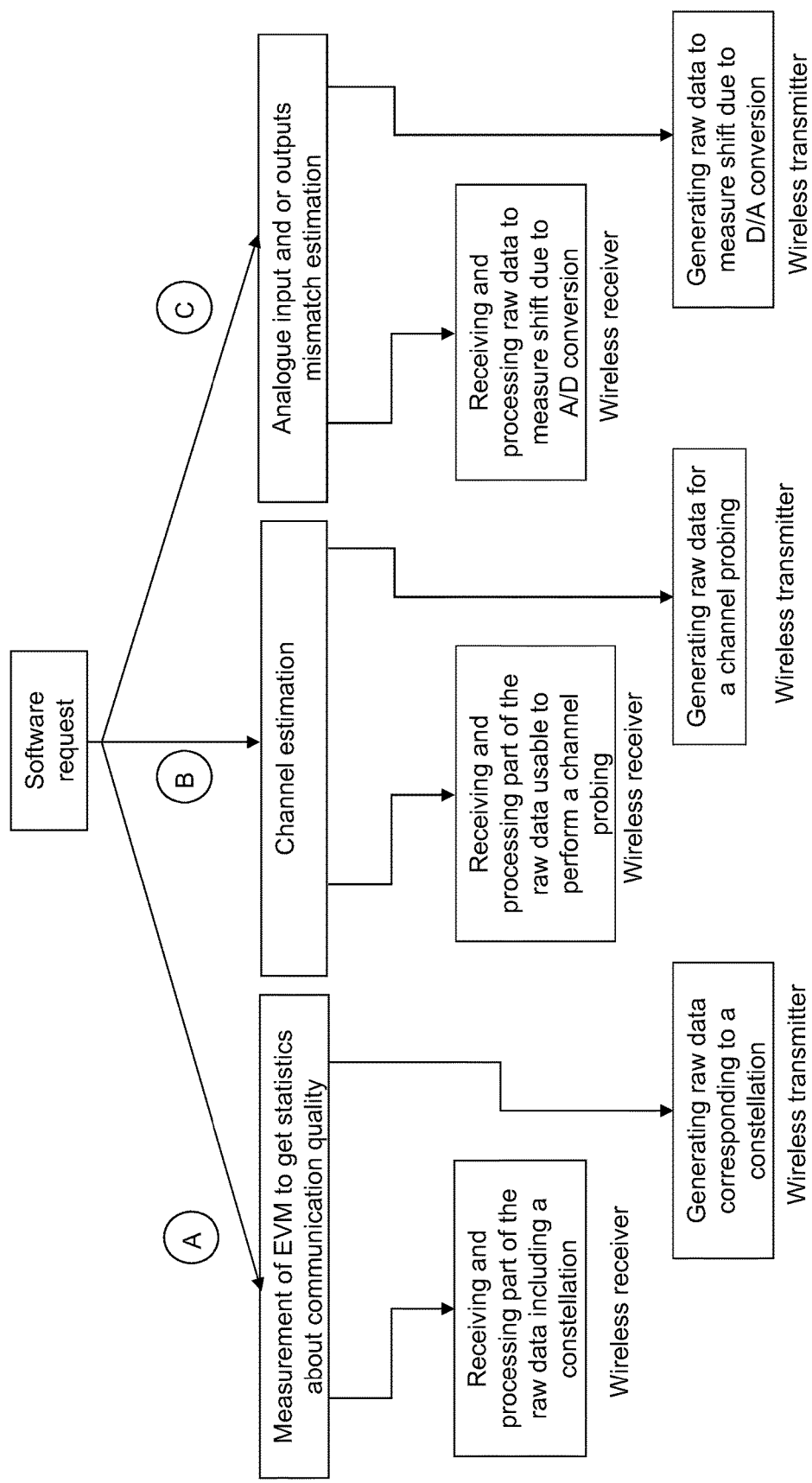
FIG. 5 illustrates various applications for transmitting raw data simultaneously with payload data over the MAC/PHY interface according to the invention in the wireless communication devices of FIGS. 2 and 3.

FIG. 5 illustrates various applications for transmitting raw data simultaneously with payload data over the MAC/PHY interface. In particular, various usages of the transmitted raw data (i.e. data having the format of PHY-layer data) by the software processing unit 260 are contemplated.

Three usage cases, A, B and C, are described, each usage case being available for the communication device 100 operating as a receiver and for the communication device 100 operating as a transmitter.

In first usage case A, the software processing unit 260 of the communication receiver 100 determines statistics about communication quality over the communication network based on the raw data in order to adjust reception or communication parameters of the communication device.

For the communication transmitter, the software processing unit 260 generates raw data as reference data dedicated for a receiving device receiving the transmitted digital signal including these reference data to determine statistics about communication quality over the communication network in order to adjust reception or communication parameters of that receiving device.

For example, an Error vector magnitude (EVM) can be computed using the raw data. EVM is based on the values of constellation points inserted in the transmitted signal and reflects the distance between received signals and expected value of the signals (value of the signals if no impairment or degradation of signals occurs during transmission).

Scanning the value of that vector allows for the communication device 100 to take into account degradation of the communication quality before loss of data, for instance by changing reception parameters like antenna direction when EVM vector magnitude is continuously increasing.

As a consequence, raw data 314 generated by the software processing unit 260 of the transmitter are thus symbols made of constellation points as defined for EVM.

Correspondingly, raw data 214 selected within the raw data selector 210 of the receiver and processed by its software processing unit 260 are those symbols made of constellation points, located at a predefined position in digital signals 125.

In another embodiment where obtaining statistics on the received signal power is contemplated, the PHY part 110 may generate non-demodulated data based on received raw data, e.g. by computing the square of the magnitude of the received digital signal 125 (at each of its samples). Then such non-demodulated data are transmitted to the MAC part 150 using the teachings of the invention.

In yet another embodiment contemplating a level of channel occupancy/use, the PHY part 110 may generate non-demodulated data based on received raw data, e.g. by transforming the raw data as follows: a generated non-demodulated signal equals 0 (at samples) where the absolute value of the received signal 125 is lower than a threshold, and equals the received signal 125 where the absolute value of the latter is higher than the threshold. Then such non-demodulated data are transmitted to the MAC part 150 using the teachings of the invention.

In second usage case B, the software processing unit 260 of the communication receiver 100 determines a state of a communication channel in the communication network based on the raw data.

For the communication transmitter, the software processing unit 260 generates raw data as reference data dedicated for a receiving device receiving the transmitted digital signal including these reference data to determine a state of a communication channel in the communication network.

For example, some symbols useful to perform an assessment of the channel, like the preamble symbols defined in 802.15.3c or 802.11ad, may be generated and processed by the software processing unit.

As a consequence, raw data 314 generated by the software processing unit 260 of the transmitter are those preamble symbols. They are then transmitted to the PHY layer using the mechanisms of the invention, namely the multiplexing with payload data in TPs.

Correspondingly, raw data 214 selected within the raw data selector 210 of the receiver and analyzed a posteriori by its software processing unit 260 are those preamble symbols.

One may note that usage case B is an alternative to usage case A. Indeed, instead of using EVM to monitor the channel variation, channel estimation data internal to the receiver is used to control the quality communication.

In third usage case C, the software processing unit 260 of the communication receiver 100 determines, based on the raw data, signal distortion due to a processing entity internal to the communication device, in order to adjust at least one operational parameter of the internal processing entity.

For the communication transmitter, the software processing unit 260 determines, based on the generated raw data, signal distortion due to a processing entity internal to the communication device, in order to adjust at least one operational parameter of the internal processing entity.

It may concern measurement of signals for chip calibration, for instance for chip manufacturing, defining threshold parameters.

For example, knowledge on raw data can be used for gain adjustment. Knowledge of raw data at the input of the A/D converter 130 can be used for reception parameters adjustments. Knowledge of raw data by the software processing unit can be used to set up default signal processing coefficient to be applied to the raw data signals in order to reverse the gain mismatch between the signal 135 converted into raw data 125.

For purposes of illustration, let consider A/D converter calibration.

At high data rate, high accuracy of A/D conversion is difficult to guarantee. Then during manufacturing of a receiver, a calibration process is currently used.

The calibration process consists to enter a known signal at the input of the A/D converter 130 and to measure the delivered digital data.

Then internal gain of the A/D converter is tuned in order to get the expected digital data. Indeed, signals of the receiver (which are the outputs of the A/D converter) implemented through raw data according to the invention can be used to control the calibration process.

As a consequence, raw data 214 selected within the raw data selector 210 of the receiver can be raw data or symbols corresponding to this known signal. They are transmitted to the software processing unit 260 that can analyze them to obtain measurements for calibration.

A similar issue at the wireless transmitter can be resolved in the same way.

The generation of raw data (the above known signal) by the software processing unit 260 can also be used to calibrate the mismatch for D/A converters 130 in the wireless transmitter.

Raw data are generated by the software processing and transmitted to the PHY part 110 according to the invention.

Resulting analogue signals 136 are captured at the output of D/A converter 130.

A post-processing is used to compare the capture signals and the raw data generated by the software processing unit 260.

Based on this comparison, the mismatch in phase and amplitude is determined and used to calculate the coefficient to be used by the signal processing unit 260 to correct those impairments.

The above examples are merely embodiments of the invention, which is not limited thereby.

The invention claimed is:

1. A communication device in a communication network, comprising:
    a signal processing unit configured to demodulate symbols of a received digital signal at a PHY layer into demodulated payload data and to provide the demodulated payload data to a data processing unit of a Data Link layer through an interfacing link between the PHY layer and the Data Link layer, the received digital signal being made of raw data;
    a bandwidth determining module configured to determine bandwidth that is available in addition to demodulated payload data corresponding to one symbol in a transmission slot allocated to the one symbol of the received digital signal for transmitting the corresponding demodulated payload data through the interfacing link, the available bandwidth being determined based on the interface link bandwidth and a code rate of the demodulated payload data;
    a sampler configured to select an amount of non-demodulated data that correspond to the determined available bandwidth, from amongst raw data of the received digital signal and data generated from raw data of the received digital signal using no demodulation; and
    a multiplexer configured to combine the selected non-demodulated data with the demodulated payload data corresponding to the one symbol within the same transmission packet and to transmit the transmission packet with in the transmission slot allocated to the one symbol over the interfacing link in order to provide the data processing unit at the Data Link layer with the combined selected non-demodulated data and demodulated payload data, thereby optimizing use of the interfacing link bandwidth.

2. The communication device of claim 1, wherein a bandwidth of the interfacing link is less than the rate of the received digital signal.

3. The communication device of claim 1, wherein the transmission slot allocated to the one symbol over the interfacing link has the same length of time as the length of time of the one symbol in the received digital signal.

4. The communication device of claim 1, wherein the bandwidth determining module is configured to determine the length of time allocated to the demodulated payload data in the transmission slot, based on a bandwidth of the interfacing link and a code rate of the demodulated payload data; and configured to determine a second length of time corresponding to the remaining time in the transmission slot.

5. The communication device of claim 1, wherein the sampler is configured to select non-demodulated data at a data rate complementary to a data rate simultaneously experienced by the signal processing unit to generate the demodulated payload data, given a data rate of the interfacing link.

6. The communication device of claim 1, wherein the multiplexer comprises a packetizer configured to generate a transmission packet for the transmission slot allocated to the one symbol, the transmission packet being made of two successive portions, a first portion including the selected non-demodulated data and a second portion including the demodulated payload data corresponding to the one symbol.

7. The communication device of claim 1, wherein the raw data are selected from non-demodulated data of the received signal that represent a symbol to be demodulated in the received signal.

8. The communication device of claim 7, wherein the raw data representing the same demodulated symbol are split over several transmission slots on the interfacing link.

9. The communication device of claim 1, further comprising a raw data selector configured to select raw data representing symbols of the received digital signal that are to be provided to the data processing unit.

10. The communication device of claim 9, wherein the raw data selector includes a frame detector configured to determine which symbols in the received digital signal correspond to a start of a data frame.

11. The communication device of claim 10, wherein the raw data selector is configured to receive a symbol selection signal from the data processing unit, wherein the symbol selection signal includes an index of a first symbol to select and a number of symbols to select; and to select symbols in the received digital signal based on the received symbol selection signal and on a data frame start signal generated by the frame detector.

12. The communication device of claim 9, wherein the raw data selector includes a symbol storage module configured to store the raw data representing symbols selected from the received digital signal before they are sampled by the sampler and multiplexed with payload data in transmission slots.

13. A communication device in a communication network, comprising:

a data processing unit at a Data Link layer configured to obtain payload data to be provided to a signal processing unit at a PHY layer through an interfacing link between the PHY layer and the Data Link layer;

a signal processing unit at the PHY layer configured to modulate the received payload data into modulated symbols of a digital signal and to transmit the digital signal over the communication network; wherein the data processing unit comprises:

a raw data generator configured to generate raw data;

a bandwidth determining module configured to determine bandwidth that is available in addition to payload data corresponding to one modulated symbol in a transmission slot used to transmit, through the interfacing link, the payload data corresponding to the one modulated symbol, the available bandwidth being determined based on the interface link bandwidth and a code rate of the payload data;

a sampler configured to select an amount of generated raw data corresponding to the determined available bandwidth; and a multiplexer configured to combine the selected raw data with the payload data corresponding to the one modulated symbol within the same transmission packet and to transmit the transmission packet within the transmission slot corresponding to the one modulated symbol over the interfacing link in order to provide the signal processing unit at the PHY layer with the combined selected raw data and payload data, thereby optimizing use of the interface link bandwidth;

wherein the signal processing unit is configured to include the raw data as received from the data processing unit in the digital signal together with the one modulated symbol before transmitting the digital signal over the communication network.

14. The communication device of claim 13, wherein a bandwidth of the interfacing link is less than the rate of the digital signal to be transmitted over the communication network.

15. The communication device of claim 13, wherein the transmission slot allocated to transmit payload data corresponding to the one modulated symbol has the same length of time as the length of time of the one modulated symbol in the digital signal to be transmitted over the communication network.

16. The communication device of claim 13, wherein the bandwidth determining module is configured to estimate a code rate at which the payload data are modulated by the signal processing unit and to estimate a length of time allocated to the payload data in the transmission slot, based on a bandwidth of the interfacing link and the estimated code rate of the payload data; and configured to determine a second length of time corresponding to the remaining time in the transmission slot.

17. The communication device of claim 13, wherein the sampler is configured to select raw data at a data rate complementary to an estimated data rate experienced by the signal processing unit to generate the modulated symbols, given a data rate of the interfacing link.

18. The communication device of claim 13, wherein the multiplexer comprises a packetizer configured to generate a transmission packet for the transmission slot allocated to the payload data corresponding to the one modulated symbol, the transmission packet being made of two successive portions, a first portion including the selected raw data and a second portion including the payload data corresponding to the one modulated symbol.

19. A method for processing data in a communication device of a communication network, comprising:

in a signal processing unit, demodulating symbols of a received digital signal at a PHY layer into demodulated payload data and to provide the demodulated payload data to a data processing unit of a Data Link layer through an interfacing link between the PHY layer and the Data Link layer, the received digital signal being made of raw data;

determining bandwidth that is available in addition to demodulated payload data corresponding to one symbol in a transmission slot allocated to the one symbol of the received digital signal for transmitting the corresponding payload data through the interfacing link, the available bandwidth being determined based on the interface link bandwidth and a code rate of the demodulated payload data;

selecting an amount of non-demodulated data that correspond to the determined available bandwidth, from amongst raw data of the received digital signal and data generated from raw data of the received digital signal using no demodulation; and in a multiplexer, combining the selected non-demodulated data with the demodulated payload data corresponding to the one symbol within the same transmission packet and to transmit the transmission packet with in the transmission slot allocated to the one symbol over the interfacing link in order to provide the data processing unit at the Data Link layer with the combined selected non-demodulated data and demodulated payload data, thereby optimizing use of the interfacing link bandwidth.

20. A method for processing data in a communication device of a communication network, comprising:

in a data processing unit at a Data Link layer, obtaining payload data to be provided to a signal processing unit at a PHY layer through an interfacing link between the PHY layer and the Data Link layer;

in a signal processing unit at the PHY layer, modulating the received payload data into modulated symbols of a digital signal and to transmit the digital signal over the communication network;

wherein the method further comprises, in the data processing unit:

generating raw data;

determining bandwidth that is available in addition to payload data corresponding to one modulated symbol in a transmission slot used to transmit, through the interfacing link, payload data corresponding to the one modulated symbol, the available bandwidth being determined based on the interface link bandwidth and a code rate of the payload data;

selecting an amount of generated raw data corresponding to the determined available bandwidth;

combining the selected raw data with the payload data corresponding to the one modulated symbol within the same transmission packet and to transmit the transmission packet within the transmission slot corresponding to the one modulated symbol over the interfacing link in order to provide the signal processing unit at the PHY layer with the combined selected raw data and payload data, thereby optimizing use of the interface link bandwidth;

wherein the method further comprises, in the signal processing unit, including the raw data as received from the data processing unit in the digital signal together with the one modulated symbol before transmitting the digital signal over the communication network.

\* \* \* \* \*